(No Model.)

O. PIPER & J. E. NEWTON.
WEFT FORK.

No. 525,965. Patented Sept. 11, 1894.

Witnesses
Edward F. Allen.
Louis N. Gowell.

Inventors.
Orin Piper.
James E. Newton
by Crosby & Gregory
attys.

UNITED STATES PATENT OFFICE.

ORIN PIPER AND JAMES E. NEWTON, OF MANCHESTER, NEW HAMPSHIRE.

WEFT-FORK.

SPECIFICATION forming part of Letters Patent No. 525,965, dated September 11, 1894.

Application filed December 15, 1893. Serial No. 493,783. (No model.)

*To all whom it may concern:*

Be it known that we, ORIN PIPER and JAMES E. NEWTON, of Manchester, county of Hillsborough, State of New Hampshire, have invented an Improvement in Weft-Forks, of which the following description, in connection with the accompanying drawings, is a specification, like letters on the drawings representing like parts.

This invention has for its object the production of a novel weft fork, wherein the tines are so held as to be readily removable from the body of the fork whenever, for any reason, a tine becomes bent or broken and it is desired to substitute a new tine therefor.

Our invention consists essentially in a weft fork composed of a head grooved for the reception of the tines, a series of metallic tines, a pivoted cover for said tines, and a locking device to retain said cover in position, all constructed and arranged to operate substantially as hereinafter described and indicated in the claims at the end of the specification.

Figure 1:
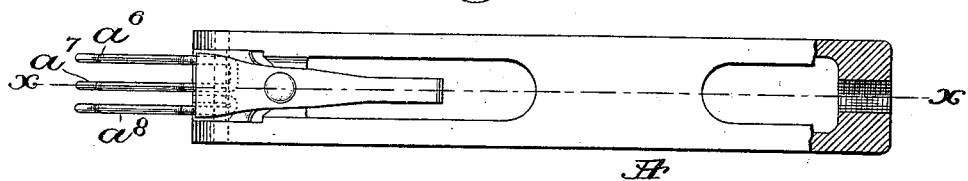
Figure 2:
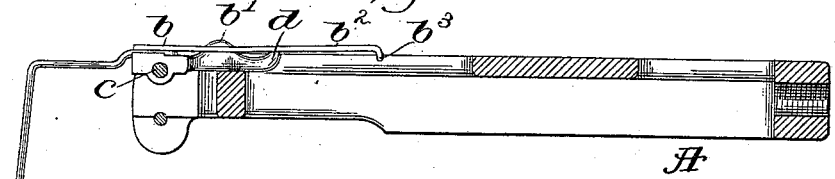
Figure 3:
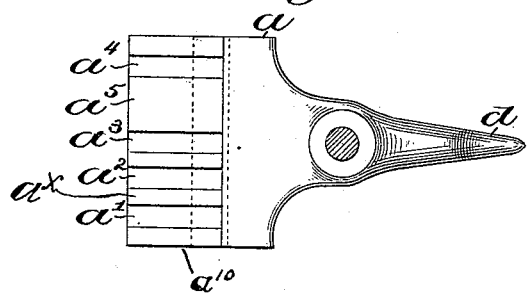

Figure 1 is a top or plan view of a weft fork embodying our invention. Fig. 2 is a section thereof in the dotted line $x$—$x$ Fig. 1. Fig. 3 represents the head alone but enlarged.

The head $a$ of our improved weft fork has at its upper side an upright shoulder or projection $a^{10}$, see Fig. 3, which projection is provided at its top or face with a series of grooves $a'$, $a^2$, $a^3$, $a^4$, the grooves $a^3$, $a^4$ being separated by a projection $a^5$, said grooves receiving a bent wire constituting the two tines $a^6$, $a^7$, the said wire being bent as best shown in Figs. 1 and 2. The grooves $a'$, $a^2$, separated by the projection $a^x$ receive the loop-like bent end of the tine $a^8$. With portions of the tine lying in the grooves as shown, any lateral movement of the tines with relation to the head is obviated and yet when the said bent portions are uncovered by the covering plate $b$ then the said tines may be readily removed and other tines substituted for them. The head $a$ is pivoted to the usual slide bar A by a pivot $c$. The head $a$ as herein represented is provided at its rear side with a projecting spur or prong $d$. The covering plate $b$ is represented as applied to the head by a pivot $b'$ about which said cover is adapted to turn when it is desired to apply or remove a tine. The covering plate in this instance of our invention is shown as composed of spring metal it having a tail piece or extension $b^2$ provided with a hook $b^3$ which in practice may be engaged by the usual weft hammer whenever the downturned prongs of the tines do not meet a weft.

Our improved weft fork is very strong and durable, and a tine may be readily supplied if bent or injured, and the tail piece, when made of sheet metal is very strong.

The backwardly extended arm or tail piece $b^2$ has a notch at its under side which is entered by a portion of the projection $d$, the two, co-operating together, serving as a locking device to keep the covering plate in position to retain the tines in the grooves of the head.

Prior to our invention, we are aware that the head of a weft fork has been drilled vertically to provide holes for the bent end of a tine, and that the said head has been grooved from said holes to its front side, and also that a cap covering the tines has been grooved to fit the tines, to thereby hold the said tines firmly in position. So also are we aware that a piece of wire has been bent in such shape as to form the outermost tine of a weft fork and also the shank thereof, and that said wires, as well as the inner end of the middle tine, have been held in grooves made respectively in the head of the weft fork and tine covering cap. In no instance, however, prior to our invention, are we aware that the inner end of the tine, where the tine engages the head and is acted upon by the cap, has been made as a loop to bend around and engage a projection intermediate the grooves receiving the wires of the tines.

The tines, confined in accordance with our invention, are held in place more securely than in any other manner known to us, and by the employment of the pivoted cap having a connected shank so that it can readily be turned to uncover the inner ends of the tines, the latter may be quickly changed whenever desired.

Having described our invention, what we claim as new, and desire to secure by Letters Patent, is—

1. The within described weft fork, comprising a slide-bar, the head $a$ pivoted to said slide-bar and having the grooves $a'$, $a^2$, $a^3$, $a^4$ and interposed projections $a^5$ and $a^\times$, and the spur $d$, a series of tines having their inner ends formed as loops to lie in said grooves and embrace said projections, thereby to retain the tines in the head against lateral and longitudinal displacement, and the covering plate $b$ pivoted to said head and inclosing the loops of the tines within the grooved head and itself sprung into locking engagement with the spur of the head, substantially as described.

2. The combination with the weft fork slide bar, its pivoted head provided with a prong or projection $d$, and with grooves for the reception of a series of tines, and a yielding covering plate pivoted thereon and provided with a tail piece adapted to bear on said prong or projection, substantially as described.

3. In a weft fork, a slide-bar, a head $a$ pivoted thereto and provided with grooves $a'$, $a^2$, $a^3$, $a^4$, and projections $a^\times$, $a^5$; a series of tines having their inner ends bent into loop form to lie in said grooves and embrace said projections which extend from the top of the said head; a spring metal covering plate pivoted on said head and having a hook $b^3$, and locking means to lock the said covering plate and the projection of the head together, substantially as described.

In testimony whereof we have signed our names to this specification in the presence of two subscribing witnesses.

ORIN PIPER.
JAMES E. NEWTON.

Witnesses to Orin Piper:
C. H. BARTLETT,
JAMES B. TUTTLE.

Witnesses to James E. Newton:
LLOYD E. WHITE,
HARRIS W. FORBES.